(12) United States Patent
Venkatachary et al.

(10) Patent No.: US 6,636,956 B1
(45) Date of Patent: Oct. 21, 2003

(54) MEMORY MANAGEMENT OF STRIPED PIPELINED DATA STRUCTURES

(75) Inventors: Srinivasan Venkatachary, Sunnyvale, CA (US); Pankaj Gupta, Mountain View, CA (US); Anand Rangarajan, Sunnyvale, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 97 days.

(21) Appl. No.: 09/900,748

(22) Filed: Jul. 6, 2001

(51) Int. Cl.$^7$ .............................................. G06F 12/00
(52) U.S. Cl. ........................ 711/170; 711/169; 711/167
(58) Field of Search ................................ 711/170, 169, 711/167

(56) References Cited

U.S. PATENT DOCUMENTS

| | | | |
|---|---|---|---|
| 5,652,581 A | * | 7/1997 | Furlan et al. ................... 341/51 |
| 5,956,340 A | * | 9/1999 | Afek et al. ...................... 370/412 |
| 6,008,820 A | * | 12/1999 | Chauvin et al. ............. 345/502 |
| 6,209,020 B1 | | 3/2001 | Angle et al. |
| 6,343,072 B1 | | 1/2002 | Bechtolsheim et al. |

\* cited by examiner

*Primary Examiner*—Reba I. Elmore
(74) *Attorney, Agent, or Firm*—Kevin L. Daffer; Conley Rose P.C.

(57) ABSTRACT

The invention provides a method and system for memory management, in which at least some individual nodes in a hybrid trie are striped across a set of pipelined memories. Memory management is performed for a hybrid trie including both branch-search nodes and leaf-search nodes and maintained in a sequence of pipelined memories. The method provides for insertion and removal of data elements within the hybrid trie and for storing at least some of the nodes in stripes across a sequence of the memories. Memory management is performed for the leaf-search nodes, by selecting stripes from the possible subsequences of those memories, that are suited to pipelined operations performed on the memories. In a preferred embodiment, an invariant condition is maintained for families of those stripes, in which exactly one cell block is labeled "sparse" and that cell block is used in techniques for allocation and de-allocation of entries.

32 Claims, 2 Drawing Sheets

Method 200

Method 300

MEMORY MANAGEMENT OF STRIPED PIPELINED DATA STRUCTURES

BACKGROUND OF THE INVENTION

1. Field of the Invention

This invention relates to memory management of data structures in a striped pipelined set of memories.

2. Related Art

In a pipelined data structure such as described in the incorporated disclosures, a sequence of memories are used for pipelined lookup and update operations on a compact data structure in a pipelined architecture. As described in the incorporated disclosures, the data structure is maintained in a sequence of memories. It is desirable to manage use of those memories so that update operations can be performed for those data structures while simultaneously maintaining (a) low worst-case memory requirement, that is, relatively good worst-case memory utilization, (b) low update complexity, that is low complexity of hardware and software for update operations, and (c) low worst-case time requirement, that is, relatively good worst-case speed.

Accordingly it would be desirable to have a technique for update operations performed on a compact data structure in a pipelined architecture, in which the data structure includes stripe for a set of nodes in a hybrid trie, and that simultaneously maintains the desirable features noted above. It would be advantageous if that technique were well adapted to pipelined operation, such as further described in the incorporated disclosures. The following features would be advantageous:

It would be advantageous if that technique were capable of relatively rapid insertion of new data elements while minimizing time requirements.

It would be advantageous if that technique were capable of relatively rapid removal of old data elements while minimizing time requirements.

These advantages and others are provided in an embodiment of the invention, described herein, including a memory management technique in which individual nodes in a hybrid trie are striped across a set of pipelined memories.

SUMMARY OF THE INVENTION

The invention provides a method and system for memory management, in which at least some individual nodes in a hybrid trie are striped across a set of pipelined memories. Memory management is performed for a hybrid trie including both branch-search nodes and leaf-search nodes and maintained in a sequence of pipelined memories. The method of memory management provides for insertion and removal of data elements within the hybrid trie and for storing at least some of the nodes (the leaf-search nodes) in stripes across a sequence of the memories. Memory management is performed for the leaf-search nodes (those nodes that are stored in stripes across a sequence of the memories), by selecting stripes from the possible subsequences of those memories, that are suited to pipelined operations performed on the memories. In a preferred embodiment, an invariant condition is maintained for families of those stripes, in which exactly one cell block in each family is labeled "sparse" and that cell block is used in techniques for allocation and de-allocation of entries.

The invention has general applicability to memory management in which data structures are distributed across a set of distinct memories. None of the e applications are limited specifically to update operations for hybrid tries, or to data strictures for lookup of message header information, nor are they necessarily related to the specific applications disclosed herein.

DESCRIPTION OF THE PREFERRED EMBODIMENT

Figure 1:
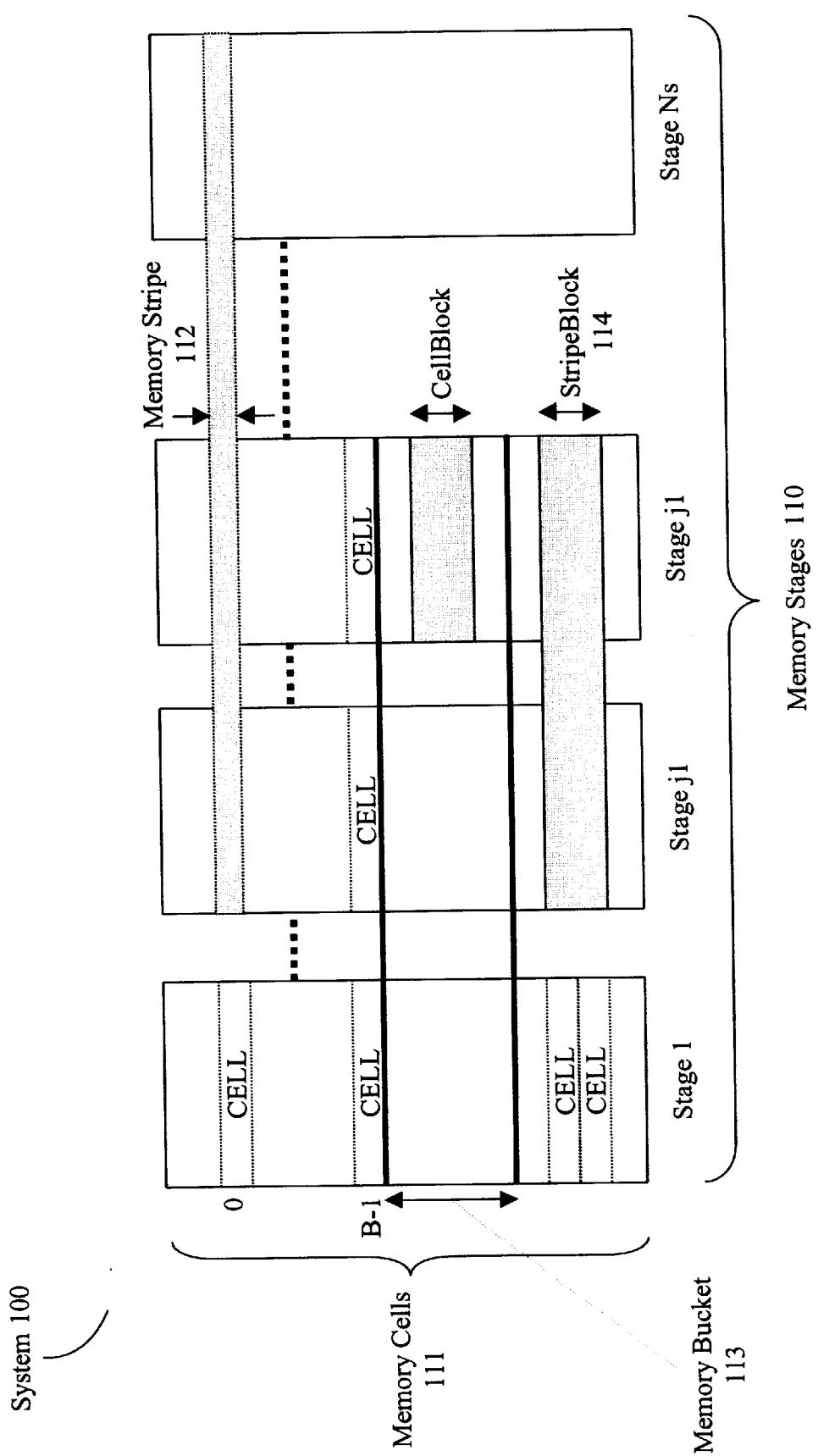
FIG. 1 shows a diagram of a memory and data structure having at least some data elements striped across a sequence of pipelined memories.

The invention is described herein with regard to preferred step, and data structures. Those skilled in the art will recognize, after perusal of this application, that the described steps and data structures are not limited to any particular circuits. Rather, those of ordinary skill in the art would be able to implement the described steps and data structures, and equivalents thereof, without undue experimentation or further invention. All such implementations are within the scope and spirit of the invention.

Related Applications

Inventions described herein can be used in conjunction with inventions described in the following documents:

U.S. patent application Ser. No. 09/827,270, Express Mail Mailing No. EL 734 816 392 U.S., filed Apr. 4, 2001 in the name of the same inventors, attorney docket No. 211.1002.01, titled "Message Forwarding Using Pipelined Lookup".

These documents are hereby incorporated by reference as if fully set forth herein. These documents are referred to as the "incorporated disclosures".

Lexicography

The following terms refer or relate to aspects of the invention as described below. The descriptions of general meanings of these terms are not intended to be limiting, only illustrative.

memory stage—in general, a set of memory cells substantially independently accessible during a pipelined operation. In a preferred embodiment, a set of memory stages are each used for a portion of an address for which lookup is performed, thus allowing a sequence of lookups to proceed at the rate of one per memory access even if each individual lookup takes multiple memory accesses.

memory cell—in general, a logically individually accessed element of memory. There is no particular requirement regarding the size of a memory cell, so that a memory cell might include multiple "bytes" or "words" of memory as those terms are known in the arts of computer science. However, hardware constraints might cause an individual memory cell to be read with other additional data, and the additional data discarded (such as using a mask); for example, if an 8-bit memory cell is included within a memory read that includes 128 bits of data, the 8-bit memory cell would be sectioned off after the read and independently treated.

memory stripe—in general, a set of data that fits into an individual set of memory cells, one memory cell for each one of a sequence of memory stage. Thus, a memory stripe is identified by the address at which it is found in each respective memory stage.

stripe block—in general, a set of data that fits into a sub-bucket, n memory cells in a block for each one of a sequence of memory stages, thus, a group of n memory stripes. There is no particular requirement that the n memory cells in a stripe block will completely fill each cell block in the sub-bucket (rather, in most cases those n memory cells will not fill those cell blocks), so while a memory stripe is "smaller" than a stripe block, a stripe block is therefore "smaller" than a sub-bucket.

memory bucket—in general, a set of memory cells in each memory stage having associated addresses, so that the set includes memory cells at each memory stage that are accessible in parallel. There is no particular requirement that the memory cells at each memory stage must have identical addresses, so that for example a memory stripe might be logically defined by pointers at each memory stage to the memory cells in the next memory stage. In a preferred embodiment, each memory bucket has an identical number of memory cells (BucketSize) for each memory stage; however, there is no particular requirement therefor.

sub-bucket—in general, a subset of a memory bucket having a span from a starting memory stage to an ending memory stage, where the sub-bucket might (but is not required to) exclude memory cells in a cell block from at least one memory stage. Thus, while a stripe block is "smaller" than a sub-bucket, a sub-bucket is "smaller" than a memory bucket.

cell block—in general, a sub-bucket having a span of exactly one, that is, including memory cells from exactly one memory stage.

span, spanning value—in general, the memory stages occupied by a stripe block, or alternatively, a measure of the number of those memory stages. Thus, a stripe block from a memory stage A to a memory stage B would have a span (A, B) or a spanning value of (B−A+1).

family of sub-buckets—in general, a logical group of sub-buckets collectively satisfying a known invariant property.

invariant property—in general, a property of a family of sub-bucket that is maintained without change (that is, maintained invariant) by the methods of allocation and de-allocation.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

Data Elements Striped Across a Sequence of Pipelined Memories

FIG. 1 shows a diagram of a memory and data structure having at least some data elements striped across a sequence of pipelined memories.

A system 100 includes a plurality of memory stages 110, each of which includes a plurality of memory cells 111. Each memory cell 111 has an address within its memory stage 110. Thus, where there are NumStages memory stages 110, each having NumCells memory cell 111, each memory cell 111 can be referenced using an identifier for its memory stage 110 and an address for that memory cell 111 within that memory stage 110. Addresses for memory cells 111 preferably include those integers from 0 to (NumCells−1). In a preferred embodiment, each memory stage 110 includes a separately addressable memory, so that access to the plurality of memory stages 110 can be performed in a pipelined manner. However, methods described herein are capable of being performed even if the plurality of memory stages 110 are not each separately addressable (such as for example in cases where pairs of those memory stages 110 are combined into dual-port memories and are addressable in pairs).

In a preferred embodiment, each memory stage 110 includes the same number of memory cells 111; however, in alternative embodiments, each memory stage 110 may include differing numbers of memory cells 111. In such cases, methods shown herein for recording and retrieving portions of a data structure to be maintained in the system 100 can still be performed, by treating each memory stage 110 as having the same number of memory cells 111, with those memory cells 111 having addresses beyond the size of each particular memory stage 110 being marked as being in use.

Memory cells 111 having the same address within their respective memory stages 110 are logically grouped into memory stripes 112. Thus, a memory stripe 112 is identified by the address at which it is found in each respective memory stage 110. In a preferred embodiment, there is no physical distinction between those memory cells 111 within and those memory cells 111 not within a selected memory stripe 112. Assignment of memory cells 111 to memory stripes 112 is a logical construct used by methods described herein Memory cells 111 are also logically grouped into memory buckets 113, each of which includes a selected number BucketSize of memory cells 111, and each of which has a bucket index. Addresses for memory cells 111 in each memory bucket 113 for a selected memory bucket 113 having bucket index BucketIndex preferably include those integers from (BucketIndex*BucketSize) to ((BucketIndex+1)*BucketSize−1). In a preferred embodiment, there is no physical distinction between those memory cells 111 within a selected memory bucket 113 and those memory cells 111 not within a selected memory bucket 113. Assignment of memory cells 111 to memory buckets 113 is a logical construct used by methods described herein. Within each memory bucket 113, a sub-bucket 114 includes a contiguous subset of the NumStages memory stages 110, so that a sub-bucket 114 includes a first memory stage 110, a last memory stage 110, and those memory stages 110 in between.

A sub-bucket 114 therefore includes a logical grouping of a set of memory stripes 112 having contiguous addresses of memory cells 111, that is, a set of memory stripes 112 including a corresponding contiguous set of memory cells 111 for each memory stage 110. A sub-bucket 114 having exactly one memory stage 110 is sometimes referred to herein as a "cell block". As noted above, in a preferred embodiment, there is no physical distinction between those memory cells 111 within selected sub-buckets 114 and those memory cells 111 not within selected sub-buckets 114; assignment of memory cells 111 to sub-buckets 114 is a logical construct used by methods described herein.

As further described in the incorporated disclosures, a hybrid trie includes a set of branch-search nodes and a set of leaf-search nodes. Each branch-search node is preferably maintained in a sub-bucket 114 having only a single memory stage 110 (that is, a single cell block), and therefore has a spanning value of exactly one. Each leaf-search node is preferably maintained in a sub-bucket 114 striped across one or more memory stages 110 (that is, more than one cell block). As described herein, the invention provides for memory management of sub-buckets 114, by allocation and de-allocation as branch-search nodes and leaf-search nodes are recorded, updated, or removed from the hybrid trie.

The hybrid trie might also include additional types of nodes besides branch-search nodes and leaf-search nodes. In a preferred embodiment, these can include loopback nodes, which indicate a start of a data structure used for looping back from the last memory stage 110 to an earlier memory stage 110. In a preferred embodiment, each loopback node is maintained in a single cell block, similar to a branch-search node, and therefore has a spanning value of exactly one.

Preferred Embodiment

Sub-buckets 114 are referred to herein as being of class (start, end) in those cases when they include that portion of a memory bucket 113 that starts with the memory stage 110 start and ends with the memory stage 110 end. A sub-bucket 114 of class (start, end) therefore includes (end—start+1) memory stages 110. Sub-buckets 114 are referred to herein as having a "span" equal to the number of memory stages 110 they include, so that for a sub-buckets 114 of class (start, end) has span (end—start+1). A sub-bucket 114 of class (stage, stage) thus has only a single memory stage 110 stage and is of span 1.

As noted above, each sub-buckets 114 preferably includes BucketSize memory cells 111 for each memory stage 110. If all those memory cells 111 are allocated, the sub-bucket 114 is referred to herein as being "full". If more than (BucketSize-DenseThreshold) of those memory cells 111 are allocated, the sub-bucket 114 is referred to herein as being "dense"; otherwise the sub-bucket 114 is referred to herein as being "sparse". All full sub-buckets 114 are necessarily dense. If none of those memory cells 111 are allocated, the sub-bucket 114 is sometimes referred to herein as being "empty". All empty sub-buckets 114 are necessarily sparse.

In a preferred embodiment, the value of DenseThreshold is set so that any allocation of a new entry takes no more entries than those available in a sparse sub-bucket 114. For example, if the maximum size of a new entry is MaxEntrySize, the value of DenseThreshold is preferably set so that DenseThreshold>=(greater than or equal to) MaxEntrySize.

In a preferred embodiment, sub-buckets 114 are logically grouped in families 115, where a family 115 includes a set of sub-buckets 114 Si of class (startSi, endSi) with the invariant property that there is exactly one sub-bucket 114 Si within a family 115 that is sparse. In this preferred embodiment, when all sparse sub-buckets 114 in a particular family 115 are in fact empty, exactly one sub-bucket 114 within that family 115 is designated as the "one" sparse sub-bucket 114.

In a preferred embodiment, the method 200 and the method 300 each maintain the invariant in that each family 115 has exactly one sparse cell block for each memory stage 110. That is, in each family 115, for each memory stage 110, all of the sub-buckets 114 together contribute exactly one sparse cell block. As shown below, the method 200 for allocation and the method 300 for de-allocation maintain this invariant.

Methods of Operation (Allocation)

Figure 2:
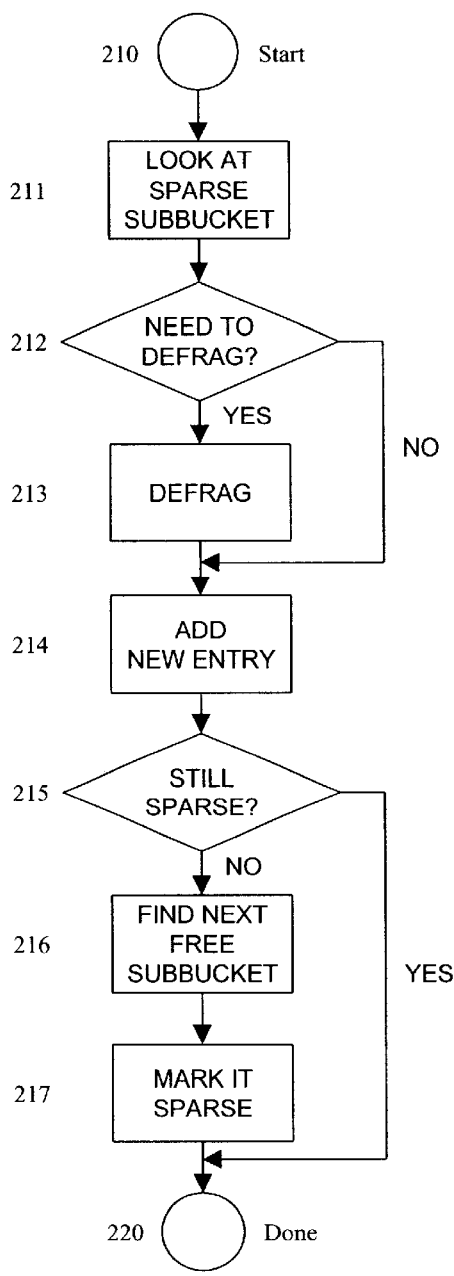
FIG. 2 shows a process flow diagram of a method for memory management adapted to the memory and data structure shown in FIG. 1.

FIG. 2 shows a process flow diagram of a method for memory management adapted to the memory and data structure shown in FIG. 1.

A method 200 includes a set of flow points and process steps as described herein.

Although by the nature of textual description, the flow points and process steps are described sequentially, there is no particular requirement that the flow points or process steps must be sequential. Rather, in preferred embodiments of the invention, the described flow points and process steps are performed in a parallel or pipelined manner.

At a flow point 210, the method 200 is ready to allocate a new entry. This includes selecting a sub-bucket 114, and placing the new entry in the selected sub-bucket 114. In a preferred embodiment, this might occur when recording a new hybrid trie leaf-search node.

At a step 211, the method 200 selects the sparse sub-bucket 114 in the appropriate family 115.

By the invariant described in the section "Preferred Embodiment", the sub-bucket 114 is sparse and therefore has enough memory cells to allocate the new entry. Thus, it is necessarily possible to allocate the new entry. However, it is possible that those memory cells are not contiguous.

At a step 212, the method 200 determines if the sparse sub-bucket 114 has enough contiguous memory cells (individual memory cells in each memory stage in the sub-bucket 114) to allocate the new entry. If not, the method 200 proceeds with the next step 213. Otherwise, the method 200 proceeds with the step 214.

At a step 213, the method 200 repositions the memory cells 111 for each memory stage 110 in the sub-bucket 114 so as to provide enough contiguous memory buckets to allocate the new entry. In a preferred embodiment, the method 200 uses a binary positioning technique, also known as a "buddy system" technique. Binary positioning techniques are known in the art of computer programming.

In a preferred embodiment of the binary positioning technique, the memory cells 111 in each cell block in the sub-bucket 114 are grouped in sets of $2^k$ memory cells 111, with pairs of groups (each having $2^k$ memory cells 111) are themselves paired so as to form a larger group having $2^{k+1}$ memory cells 111. Thus, if each cell block has 64 memory cells 111, it will include two groups of 32 memory cells 111, each of which will include two groups of 16 memory cells 111, and so on, until each group of two memory cells 111 includes two individual memory cells 111. When allocating a stripe block having n memory cells 111 within a cell block, the stripe block is placed within one group having $2^k$>n memory cells 111. The selected group having $2^k$>n memory cells 111 is preferably selected so that the selected group is as separated from other allocated memory cells 111 in the cell block, to allow room for entries to grow incrementally.

At a step 214, the method 200 adds the new entry to the sub-bucket 114. In a preferred embodiment, the method 200 uses a binary positioning technique as described with regard to the previous step 213.

At a step 215, the method 200 determines if the sub-bucket 114 remains sparse after adding the new entry. If not, the method 200 proceeds with the next step 216. Otherwise, the method 200 proceeds with the flow point 220.

At a step 216, the method 200 selects the next free sub-bucket 114 and declares it to be the "one" sparse sub-bucket 114. The invariant is thus preserved.

When selecting the new "one" sparse sub-bucket 114, the method 200 balances occupancy of memory stages 110. In balancing occupancy of memory stages 110, the method 200 attempts to substantially minimize the number of occupied cell blocks in each memory stage 110. Since each particular sub-bucket 114 occupies one cell block for each memory stage 110 within its span, that particular sub-bucket 114 contributes one cell block to occupancy of each of those memory stages 110. For each possible span, the method 200 finds the maximum occupancy for all memory stages 110 in that possible span, and selects the span having the minimum value for that maximum occupancy. In a preferred embodiment, ties can be broken randomly or in response to some other criterion.

At a flow point 220, the method 200 has completed adding the new entry while preserving the invariant, and allocation operation is therefore complete.

In a preferred embodiment, the method 200 for allocation is performed repeatedly in response to requests (to allocate new entries) that might arrive from time to time.

Methods of Operation (Deallocation)

Figure 3:
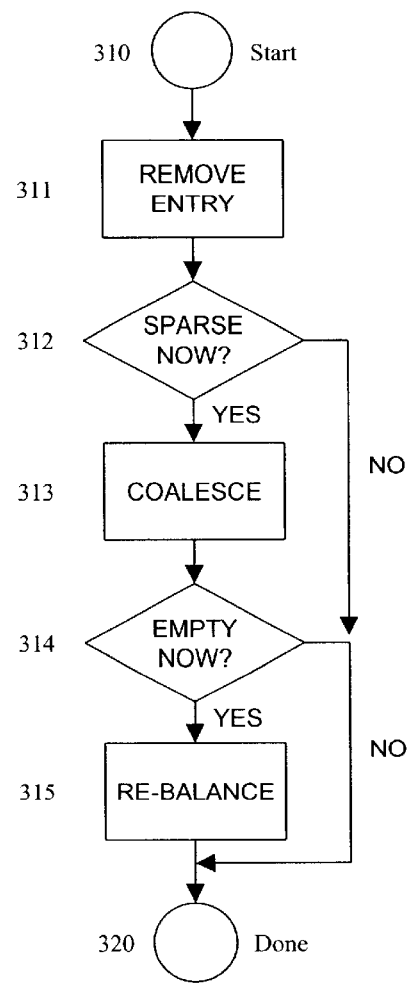
FIG. 3 shows a process flow diagram of a method for de-allocation of stripe blocks.

FIG. 3 shows a process flow diagram of a method for de-allocation of stripe blocks.

A method 300 includes a set of flow points and process steps as described herein.

Although by the nature of textual description, the flow points and process steps are described sequentially, there is no particular requirement that the flow points or process steps must be sequential. Rather, in preferred embodiments of the invention, the described flow points and process steps are performed in a parallel or pipelined manner.

At a flow point 310, the method 300 is ready to remove an entry (located in a known sub-bucket 114). In a preferred embodiment, this might occur when removing an old hybrid trie leaf-search node.

At a step 311, the method 300 removes the entry.

At a step 312, the method 300 determines if the known sub-bucket 114, which formerly contained the entry, is now sparse. If so, the method 300 proceeds with the next step 313. Otherwise, the method 300 proceeds with the step 314.

At a step 313, the method 300 coalesces the known sub-bucket 114 with the one sparse sub-bucket 114 (which preserves the invariant). As part of this step, the method 300 moves individual memory stripes from the known sub-bucket 114 to the one sparse sub-bucket 114, until one of the following two conditions occurs: (A) the known sub-bucket 114 becomes empty, or (B) the one sparse sub-bucket 114 becomes dense. In case A, the method 300 proceeds with the next step 314. In case B, the method 300 proceeds with the step 315.

At a step 314, the method 300 performs rebalancing as described above with regard to FIG. 2, and proceeds with the flow point 320.

At a step 315, the method 300 marks the one sparse sub-bucket 114 as now being dense, and the known sub-bucket 114 as now being the one sparse sub-bucket 114. The invariant is thus preserved. The method 300 proceeds with the flow point 320.

At a flow point 330, the de-allocation operation is complete.

In a preferred embodiment, the method 300 for de-allocation is performed repeatedly in response to requests (to de-allocate entries) that might arrive from time to time.

Second Preferred Embodiment

Sub-buckets 114 A and B are referred to herein as "non-overlapping" if sub-bucket 114 A is of class (startA, endA) and sub-bucket 114 B is of class (startB, endB), where endA<=(is less than or equal to) startB. Sub-buckets 114 are referred to herein as overlapping if they are not non-overlapping. In a second preferred embodiment, the sub-buckets 114 in each family 115 also have the property that all sub-buckets 114 Si within a family 115 are pairwise non-overlapping. In this second preferred embodiment, one possible separation of all possible sub-buckets 114 into families 115 is for each family 115 Fi to include all sub-buckets 114 Si of class (Fi, endSi). In this one possible separation, there are NumStages distinct families 115, each one beginning at a distinct memory stage 110 Fi and having all sub-buckets 114 of class (Fi, endSi), where endSi>=(is greater than or equal to) Fi.

In this second preferred embodiment, the invariant described with regard to the section "Preferred Embodiment" is maintained instead with regard to families as defined in this second preferred embodiment.

Generality of the Invention

The invention has general applicability to memory management in which data structures are distributed across a set of distinct memories. None of these applications are limited specifically to update operations for hybrid tries, or to data structures for lookup of message header information, nor are they necessarily related to the specific applications disclosed herein.

Other and further applications of the invention in its most general form would be clear to those skilled in the art after perusal of this application. The invention would be usable for such other and further applications without undue experimentation or further invention. Although preferred embodiments are disclosed herein, many variations are possible which remain within the concept, scope and spirit of the invention; these variations would be clear to those skilled in the art after perusal of this application.

What is claimed is:

1. A method for maintaining a set of entries in a set of memory stages each including a set of cell blocks, said method including maintenance of at least one invariant condition for said set of cell blocks in said memory stages, said invariant condition defining a selected number of available entries for allocation within a selected one of said cell blocks;

selection of a sub-bucket defined using said cell blocks, said selected sub-bucket including said selected one cell block;

allocation of new entries in said selected one cell block; and wherein said invariant condition includes having exactly one cell block marked sparse for each said memory stage defined for said sub-bucket.

2. A method as in claim 1, including determination of whether said selected one cell block retains said selected number of available entries after allocation, and if so, a selection of a new one of said cell blocks.

3. A method as in claim 1, wherein deallocation of old entries includes removal of said old entries from a containing cell block;

determination of whether said containing cell block acquires said selected number of available entries after de-allocation, and if so, a combination of said containing cell block with said selected one cell block.

4. A method as in claim 1, wherein said entries include nodes of a trie structure.

5. A method as in claim 1, including a rebalance of said sub-bucket, said rebalance including determination of a measure of available entries in each memory stage, said determination being responsive to a relative position of said sub-bucket in said memory stages; and reposition of said sub-bucket responsive to a result of said determination.

6. A method as in claim 5, wherein said rebalance includes determination of a maximum difference of available entries between pairs of memory stages; and determination of a selectable new position for said sub-bucket in response to a minimum one of said differences.

7. A method as in claim 5, wherein said rebalance occurs in response to allocation.

8. A method as in claim 5, wherein said rebalance occurs in response to de-allocation.

9. Apparatus for maintaining a set of entries in a set of memory stages each including a set of cell blocks, said apparatus including means for maintaining at least one invariant condition for said set of cell blocks in said memory stages, said invariant condition defining a selected number of available entries for allocation within a selected one of said cell blocks;

means for selecting of a sub-bucket defined using said cell blocks, said selected sub-bucket including said selected one cell block;

means for allocating of new entries in said selected one cell block; and wherein said invariant condition includes having exactly one cell block marked sparse for each said memory stage defined for said sub-bucket.

10. Apparatus as in claim 9, including means for determining of whether said selected one cell block retains said selected number of available entries after allocation;

means for selecting a new one of said cell blocks, responsive to an output of said means for determining.

11. Apparatus as in claim 9, including means for deallocating old entries, said means for deallocating including means for removing said old entries from a containing cell block;

means for determining whether said containing cell block acquires said selected number of available entries after de-allocation;

means for coalescing said containing cell block with said selected one cell block, responsive to an output of said means for determining.

12. Apparatus as in claim 9, wherein said entries include nodes of a trie structure.

13. Apparatus as in claim 9, including means for rebalancing said sub-bucket, said means for rebalancing including means for determining a measure of available entries in each memory stage, said means for determining being responsive to a relative position of said sub-bucket in said memory stages; and means for repositioning of said sub-bucket responsive to a result of said determination.

14. Apparatus as in claim 13, wherein said rebalance includes means for determining a maximum difference of available entries between pairs of memory stages; and means for determining a selectable new position for said sub-bucket in response to a minimum one of said differences.

15. Apparatus as in claim 13, wherein said means for rebalancing is responsive to said means for allocation.

16. Apparatus as in claim 13, wherein said means for rebalancing is responsive to said means for de-allocation.

17. Memory or mass storage including instructions interpretable by a computer or circuit to maintain a set of entries in a set of memory stages each including a set of cell blocks, including instructions to maintain at least one invariant condition for said set of cell blocks in said memory stages, said invariant condition defining a selected number of available entries for allocation within a selected one of said cell blocks;

select a sub-bucket defined using said cell blocks, said selected sub-bucket including said selected one cell block;

allocate new entries in said selected one cell block; and wherein said invariant condition includes having exactly one cell block marked sparse for each said memory stage defined for said sub-bucket.

18. Memory or mass storage as in claim 17, including instructions to determine whether said selected one cell block retains said selected number of available entries after allocation;

select a new one of said cell blocks, responsive to said instructions to determine.

19. Memory or mass storage as in claim 17, including instructions to deallocate old entries, said instructions including instructions to remove said old entries from a containing cell block;

determine whether said containing cell block acquires said selected number of available entries after de-allocation;

coalesce said containing cell block with said selected one cell block, responsive to said instructions to determine.

20. Memory or mass storage as in claim 17, wherein said entries include nodes of a trie structure.

21. Memory or mass storage as in claim 17, including instructions to rebalance said sub-bucket, said instructions to rebalance including instructions to determine a measure of available entries in each memory stage, said instructions to determine being responsive to a relative position of said sub-bucket in said memory stages; and instructions to reposition of said sub-bucket responsive to said instructions to determine.

22. Memory or mass storage as in claim 21, wherein said instructions to rebalance include instructions to determine a maximum difference of available entries between pairs of memory stages; and determine a selectable new position for said sub-bucket in response to a minimum one of said differences.

23. Memory or mass storage as in claim 21, wherein said instructions to rebalance are responsive to said instructions to allocate.

24. Memory or mass storage as in claim 21, wherein said instructions to rebalance are responsive to said instructions to de-allocate.

25. Apparatus for maintaining a set of entries in a set of memory stages each including a set of cell blocks, said apparatus including a first circuit responsive to at least one invariant condition for said set of cell blocks in said memory stages, said invariant condition defining a selected number of available entries for allocation within a selected one of said cell blocks;

a second circuit capable of selecting a sub-bucket defined using said cell blocks, said selected sub-bucket including said selected one cell block, said second circuit being responsive to an output of said first circuit;

a third circuit capable of allocating new entries in said selected one cell block, said third circuit being responsive to an output of said second circuit; and wherein said invariant condition includes having exactly one cell block marked sparse for each said memory stage defined for said sub-bucket.

26. Apparatus as in claim 25, wherein said first circuit is responsive to whether said one cell block selected by said second circuit retains said selected number of available entries after allocation by said third circuit; and said second circuit is operative in response to an output of said first circuit, to select a new one of said cell blocks.

27. Apparatus as in claim 25, including a fourth circuit capable of deallocating old entries from a containing cell block, said fourth circuit being capable of coalescing said containing cell block with said selected one cell block responsive to an output of said first circuit.

28. Apparatus as in claim 25, wherein said entries include nodes of a trie structure.

29. Apparatus as in claim 25, including a fifth circuit capable of repositioning said sub-bucket in response to a measure of available entries in each memory stage, said measure being responsive to a relative position of said sub-bucket.

30. Apparatus as in claim 29, wherein said measure maximum difference of available entries between pairs of memory stages, and a minimum one of said differences.

31. Apparatus as in claim 29, wherein said fifth circuit is responsive to said third circuit.

32. Apparatus as in claim 29, wherein said fifth circuit is responsive to said fourth circuit.

* * * * *